(12) United States Patent
Slesarev et al.

(10) Patent No.: US 10,643,071 B2
(45) Date of Patent: May 5, 2020

(54) SYSTEM AND METHOD FOR AUGMENTING AN IMAGE WITH STYLIZED FEATURES

(71) Applicant: YANDEX EUROPE AG, Lucerne (CH)

(72) Inventors: Anton Viktorovich Slesarev, Bugulma (RU); Anton Vasilyevich Korzunov, Podolsk (RU); Roman Borisovich Tokarev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 173 days.

(21) Appl. No.: 15/933,485

(22) Filed: Mar. 23, 2018

(65) Prior Publication Data

US 2018/0293439 A1    Oct. 11, 2018

(30) Foreign Application Priority Data

Apr. 5, 2017  (RU) .................................. 2017111481

(51) Int. Cl.
| | |
|---|---|
| *G06K 9/00* | (2006.01) |
| *G06K 9/46* | (2006.01) |
| *G06T 17/00* | (2006.01) |
| *G06T 7/11* | (2017.01) |
| *G06K 9/34* | (2006.01) |
| *G06F 16/29* | (2019.01) |

(Continued)

(52) U.S. Cl.
CPC ......... *G06K 9/00637* (2013.01); *G06F 16/29* (2019.01); *G06K 9/00704* (2013.01); *G06K 9/342* (2013.01); *G06K 9/4604* (2013.01); *G06K 9/4671* (2013.01); *G06T 7/11* (2017.01); *G06T 7/174* (2017.01); *G06T 11/00* (2013.01); *G06T 2207/10032* (2013.01); *G06T 2207/20081* (2013.01); *G06T 2207/20084* (2013.01); *G06T 2207/30184* (2013.01)

(58) Field of Classification Search
USPC .................. 382/90, 190, 113, 103; 345/428; 707/E17.018
See application file for complete search history.

(56) References Cited

U.S. PATENT DOCUMENTS

| | | |
|---|---|---|
| 5,581,629 A | 12/1996 | Hanna et al. |
| 8,724,914 B2 | 5/2014 | Inada |
| 8,774,470 B1 | 7/2014 | Schmidt et al. |

(Continued)

OTHER PUBLICATIONS

Search Report with regard to the counterpart RU Application No. 2017111481 completed Jun. 18, 2018.

*Primary Examiner* — Kathleen Y Dulaney
(74) *Attorney, Agent, or Firm* — BCF LLP

(57) ABSTRACT

A system and method is provided for augmenting an image with stylized features. An exemplary method includes identifying, in a first image, a first version of an object having a first set of graphical features and identifying, in a second image, a second version of the object having a second set of graphical features. Moreover, the method includes extracting the first and second sets of graphical features from the first and second images, respectively, and generating a third set of graphical features by calculating differences between the first and second sets of graphical features. Finally, using the third set of graphical features, the method includes augmenting the first version of the object in the first image.

14 Claims, 7 Drawing Sheets

(51) Int. Cl.
    *G06T 7/174*   (2017.01)
    *G06T 11/00*   (2006.01)

(56) References Cited

U.S. PATENT DOCUMENTS

| | | | |
|---|---|---|---|
| 8,924,377 B2* | 12/2014 | Wade | G06F 3/04842 |
| | | | 707/723 |
| 8,938,094 B1 | 1/2015 | Kehl et al. | |
| 10,416,866 B2* | 9/2019 | Bemel-Benrud | G01C 21/367 |
| 2005/0278386 A1* | 12/2005 | Kelly | G06F 16/29 |
| 2008/0118105 A1 | 5/2008 | Friedhoff et al. | |
| 2009/0210388 A1* | 8/2009 | Elson | G06F 16/29 |
| 2011/0058724 A1* | 3/2011 | Claus | G06T 11/006 |
| | | | 382/132 |
| 2011/0150324 A1* | 6/2011 | Ngan | G06K 9/00704 |
| | | | 382/159 |
| 2013/0088492 A1* | 4/2013 | Jagadev | G06T 11/60 |
| | | | 345/428 |
| 2013/0321422 A1 | 12/2013 | Pahwa et al. | |
| 2015/0023550 A1* | 1/2015 | Ouzounis | G06K 9/00637 |
| | | | 382/103 |
| 2015/0071528 A1* | 3/2015 | Marchisio | G06F 16/29 |
| | | | 382/159 |
| 2015/0371417 A1 | 12/2015 | Angelov et al. | |
| 2016/0026848 A1* | 1/2016 | Hamid | G06K 9/00637 |
| | | | 382/103 |
| 2016/0358311 A1 | 12/2016 | Chen et al. | |
| 2018/0052593 A1* | 2/2018 | Bemel-Benrud | G06F 3/04847 |

\* cited by examiner

SYSTEM AND METHOD FOR AUGMENTING AN IMAGE WITH STYLIZED FEATURES

CROSS-REFERENCE

The present application claims priority to Russian Patent Application No. 2017111481, filed on Apr. 5, 2017, entitled "System and Method for Augmenting an Image with Stylized Features," the entirety of which is incorporated herein by reference.

TECHNICAL FIELD

The present disclosure relates generally to image processing, and, more particularly, to a system and method for augmenting a digital image with stylized features.

BACKGROUND

There currently exist many technologies for determining and detecting objects on an electronic map or image, such as types of computer vision solutions, pixels analyses, manual human recognition, and the like. In addition, there are technologies for executing and training neural networks and other machine learning algorithms to detect objects on maps, for example, technologies for transforming a picture or a satellite image/map into a scheme map. Typically, machine learning algorithms are trained by a human moderator who shows examples by providing a satellite map and a respective scheme terrain map prepared by human, for example, of the same object at both maps so that the machine learning algorithm is trained as to how the same object(s) appears on different images/maps.

However, these technologies are limited in that if the image needs updating, the old image/map is required to be completely replaced with a new image or map. However, in some instances, the older image may have better quality and resolution than the new image. Moreover, the update process may require the new image to be purchased from one or more third parties that are providing the new geospatial image. At the same time, end users and consumers typically prefer up-to-date images showing the current landscape and features of the image in the case of a map or scene provided by a service like Yandex Maps or Google Maps, for example.

Accordingly, what is needed is a technology for updating original (or older) images to reflect the current conditions of the captured scene/landscape.

SUMMARY

The present disclosure provides for the analyzing and amending of images by extracting graphical features (of an object) from a first image and amending a second image with the features. As a result, the disclosed system and method provides for identifying various image features from several images of the same object, where the object may have changed in time.

In an exemplary aspect, the method can include receiving a first image that includes one or more objects represented in the image by pixels with a first set of graphical features and receiving a second image that includes one or more objects represented in the image by pixels with a second set of graphical features. Moreover, the object can be identified in the two images as first and second object versions, with the second object version representing an update of the first object version. The method can then apply to the first image and the second image a first machine learning algorithm, previously trained for extracting graphical features of objects, whereby the first set of graphical features and the second set of graphical features of the first object version and the second object version respectively are extracted. Moreover, a second machine learning algorithm can be applied to the first and second sets of graphical features in order to detect differences in the first and second sets of graphical features.

Furthermore, once the differences are detected, the second machine learning algorithm can generate a third set of graphical features that is based on the difference between the first and second sets of graphical features, whereby the third set of graphical features distinguishes the object view at the first and second object versions. Then, the method proceeds to generate, based on the first image, a graphical filter (i.e., a stylization) for stylizing images in accordance with graphical view of the first image. The graphical filter then applies the stylization to the third set of graphical features to stylize the third set of graphical features to the first image. Finally, the first object version at the first image can be augmented by applying the third set of graphical features to the first object version at the first image.

In another exemplary aspect, the method includes identifying, in a first image, a first version of an object having a first set of graphical features; identifying, in a second image, a second version of the object having a second set of graphical features, wherein the first and second version of the object represent the same object; extracting the first and second sets of graphical features from the first and second images, respectively; generating a third set of graphical features by calculating differences between the first set of graphical features of the first version of the object and the second set of graphical features of the second version of the object; and augmenting the first version of the object in the first image based on the third set of graphical features.

In a refinement of the exemplary aspect, the method includes providing a graphical filter based on a stylization of a graphical view of the first image; and transforming the third set of graphical features based on the graphical filter.

In a refinement of the exemplary aspect, the augmenting of the first version of the object in the first image is based on the transformed third set of graphical features.

In a refinement of the exemplary aspect, the method includes causing the first image to be displayed after the augmenting of the first version of the object in the first image.

In a refinement of the exemplary aspect, the generating of the third set of graphical features comprises generating a null third set of graphical features if the second version of the object is not included in the second image.

In a refinement of the exemplary aspect, the augmenting of the first version of the object in the first image comprises removing the object from the first image in response to the null third set of graphical features.

In a refinement of the exemplary aspect, the method includes determining changes in at least one of a color, shape, size and texture of the object between the first version and the second version of the object based on the third set of graphical features.

In a refinement of the exemplary aspect, the augmenting of the first version of the object in the first image comprises stylizing the object based on the determined changes in the at least one of a color, shape, size and texture of the object.

In another exemplary aspect, a system is provided for augmenting a digital image. In this aspect the system includes a database configured to store a first image including a first version of an object having a first set of graphical features; and a processor configured to receive a second image including a second version of the object having a second set of graphical features, wherein the first and second version of the object represent the same object, extract the first and second sets of graphical features from the first and second images, respectively; generate a third set of graphical features by calculating differences between the first set of graphical features of the first version of the object and the second set of graphical features of the second version of the object; and augment the first version of the object in the first image based on the third set of graphical features.

In a refinement of the exemplary aspect, the second image is generated based on image data obtained by a satellite.

In another exemplary aspect, a non-transitory computer readable medium comprising computer executable instructions is provided for augmenting an image. In this aspect, instructions are included for identifying, in a first image, a first version of an object having a first set of graphical features; identifying, in a second image, a second version of the object having a second set of graphical features, wherein the first and second version of the object represent the same object; extracting the first and second sets of graphical features from the first and second images, respectively; generating a third set of graphical features by calculating differences between the first set of graphical features of the first version of the object and the second set of graphical features of the second version of the object; and augmenting the first version of the object in the first image based on the third set of graphical features.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the technology and, together with the detailed description, serve to explain their principles and implementations.

DETAILED DESCRIPTION

Figure 1:
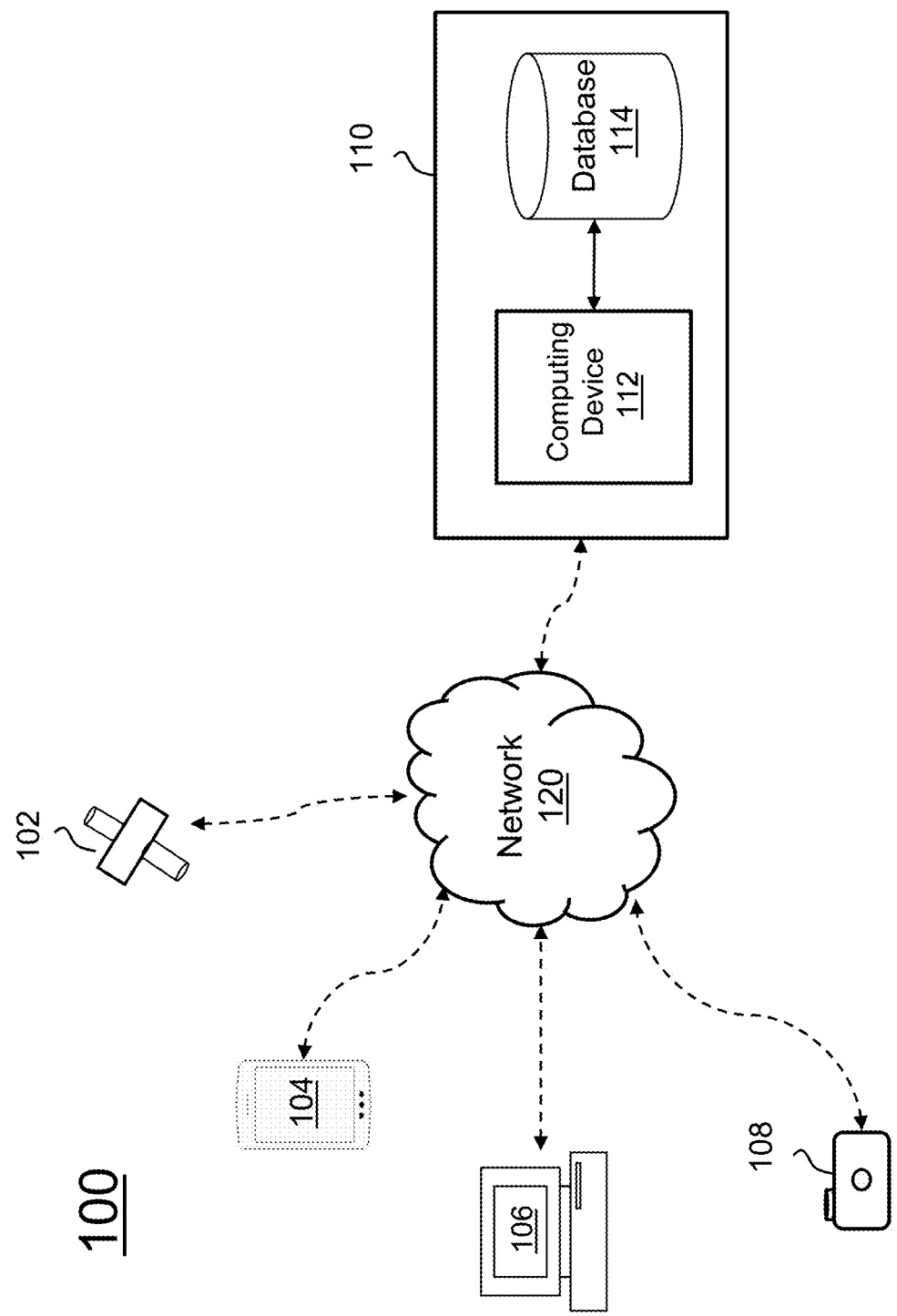
FIG. 1 illustrates a block diagram of a system for augmenting a digital image with stylized features according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system for augmenting a digital image with stylized features according to an exemplary aspect. As shown, the system 100 includes a plurality of image capturing devices 102, 014, 106 and 108 and an image augmentation device 110 that can communicate with the plurality of image capturing devices 102, 014, 106 and 108 through a network 120. In general, the network 120 can be any type of network environment for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, portions of the network can be part of the Internet or intranet using various communications infrastructure such as Ethernet, WiFi and the like.

According to the exemplary aspect, the satellite 102 is configured to capture scenes of a geographic area using known techniques. For example, the captured scenes or images can include aerial satellite images of geographic regions on a map and thus provide a visual representations of a map that depicts a real-world scene that includes various objects, such as buildings, roads, trees, bodies of water and other landmarks and structures. Moreover, the satellite 102 may be configured to transmit the captured image data using a data link for communication between the satellite 102 and the network 120. In this regard, the network 120 may include one or more satellite bases stations configured to receive the captured data and transmit it to the image augmentation device 110 (which can be comprised of one or more servers) via network 120. In one aspect, the captured image data may be transmitted as raw image data that can be processed and formatted into an appropriate image files by the image augmentation device 110 and stored in a database as will be described in more detail below.

Moreover, the other image capture devices may include, for example, a smartphone or tablet 104, a personal computer/server 106 and/or a camera 108. These devices are likewise communicatively coupled to the image augmentation device 110 by the network 120, for example, and can likewise capture image data, using a camera attached to or embedded as a hardware component. As will become readily apparent from the description below, the system and method disclosed herein is designed to receive any captured image data from two of the same scene, but at a different point at time, and augment one of the captured images with features and styles from the other image. In this regard, the specific device provided to capture and/or provide the image data is in no way limited to the specific image capture devices shown in FIG. 1. However, for purposes of this disclosure, the system and method will be described with reference to image data captured by satellite 102 that can be, for example, a geospatial image representing a map of a specified terrain.

As further shown, the image augmentation device 110 can include a computing device 112 and a database 114. In the exemplary aspect, the image augmentation device 110 is formed from one or a plurality of servers configured to receive the captured image data and process the data according to the exemplary algorithms described below. An example of the hardware and software components of the image augmentation device 110 is described below with reference to FIG. 7.

In the exemplary aspect, the computing device 112 of the image augmentation device 110 can include central processing unit ("CPU") or microprocessor that is provided to, among other things, execute an image augmentation module that is configured to receive a plurality of images and augment at least one of the images with specialized features derived from another of the images. In this aspect, the image augmentation module includes software code (e.g., processor executable instructions) in memory, which may be configured to execute/facilitate the disclosed algorithms. Furthermore, the database 114 of the image augmentation device 110 is provided to receive and store, preferably in a structured format, the plurality of captured images as well as stylization data and rules relating to the stored images. It is also contemplated that once an augmented image is generated by the image augmentation device 110, this image can be provided for display, for example, by transmitting it to a display device, such as smartphone 104 and/or personal computer 106 to be displayed thereon.

According to the exemplary aspect, the image augmentation device 110 is configured to identify various image features from several images having the same object displayed therein, but where the object may have changed in time, for example, if the satellite 102 captured image data for aerostatic map images in winter and later in summer. In this aspect, the image augmentation device 110 is configured to extract features from a first image, which can be considered a supplemental image, of which the featured can then be applied to a second image that can be considered the main or base image.

For example, a maps server (e.g., server 106) may have an image with a particular object (e.g., a building on the map), for which the server 106 has several pictures, e.g., aerostatic pictures that have been taken at different time of the year. Moreover, it is possible that these pictures may have further be taken in different zoom level and may possibly even depict the object which changes in time. For example, the object may be a building under construction (i.e., considered a first object version) and then a completed building (i.e., considered a second object version), a building with a summer image (i.e., considered a first object version) and then a winter image with snow (i.e., considered a second object version), and the like. In this regard, the image augmentation device 110 is configured to determine image features of the identified object and augment the base image (e.g., the first version of the building) with newly determined features (e.g., the fully constructed building or building with snow on the roof). Advantageously, the system does not need to rebuild the whole picture every time the object(s) changes, but can simply update the portion of the base image to include the new feature with stylization.

Figure 2:
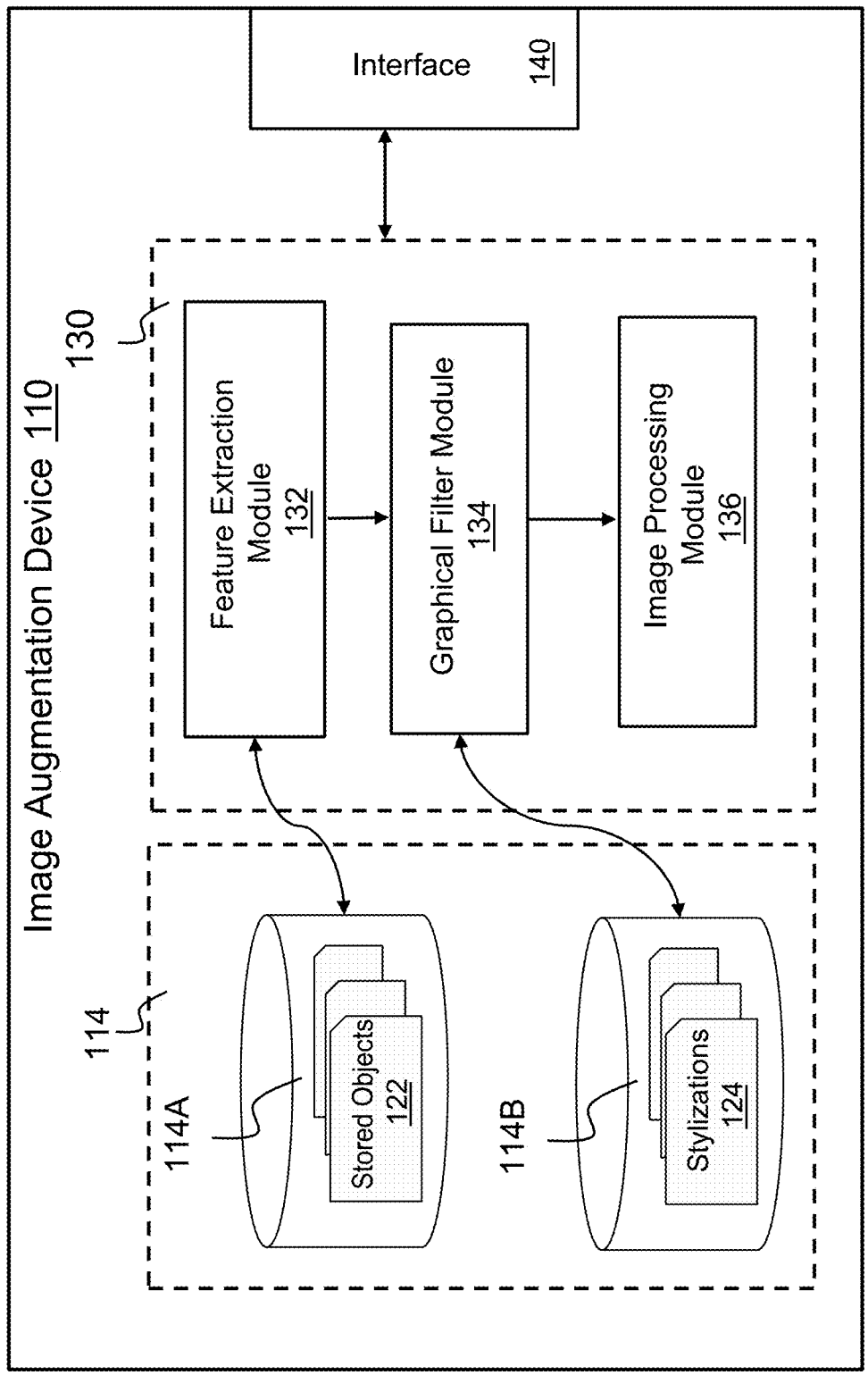
FIG. 2 illustrates a block diagram of the image augmentation device for augmenting a digital image with stylized features according to an exemplary aspect.

FIG. 2 illustrates a block diagram of the image augmentation device for augmenting a digital image with stylized features according to an exemplary aspect. As shown, the image augmentation device 110 includes the image augmentation module 130 and the database 114, which is shown to include a first database 114A of stored objects 122 and second database 114B of stylizations 124. Moreover, the image augmentation device 110 includes an interface 140 that can include, for example, a network interface controller configured to facilitate communications with each of the image capturing devices via network 120, including satellite 102, for example.

As further shown, the image augmentation module 130 can be composed of a plurality of modules or submodules. In particular, the image augmentation module 130 can include feature extraction module 132, graphical filter module 134 and image processing module 136. It should be appreciated that each of these modules can be considered a separate component or form a single software module for example.

In general, the term "module" can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

According to the exemplary aspect, the feature extraction module 132 is configured to analyze a plurality of images (at least two images) of the same scene (or at least partially of the same scene) and identify common objects in each image. For example, according to the exemplary aspect, the feature extraction module 132 is configured to perform conventional image analysis techniques for determining and detecting objects on the map image. The image analysis techniques can include, for example, computer vision solutions, pixels analysis, manual human recognition, and the like. In this regard, the feature extraction module 132 can include one or more neural networks and/or other machine learning algorithms that can be trained to detect specific objects on maps (e.g., when transforming a picture or a satellite map into a scheme map). The machine learning algorithms can be trained, for example, by a human moderator who shows examples, such as providing a satellite map and a respective scheme terrain map of the same object at both maps so the machine learning algorithm is trained on how identify how the same objects may look at different map images. These machine learning algorithms for identifying specific objects in an image are generally known to those skilled in the art and will not be described in detail herein.

However, according to the exemplary aspect, the feature extraction module 132 is further configured to extract particular identified graphical features from the common object identified each images (i.e., the base image and the supplemental image). For example, using a machine learning algorithms, the feature extraction module 132 can extract a first set of graphical features from the first object version in the first (i.e., base) image and a second set of graphical features from the second object version in the second (i.e., supplemental) image. Applying the machine learning algorithm, the feature extraction module 132 is further configured to detect the graphical differences of the object between the two images. In this regard, the feature extraction module 132 can be trained to work with colors, shapes and sizes of the features and can extract particular features correspond to the graphical differences. As described herein, the machine learning algorithm may be a neural network, for example, a Convolution Neural Network, according to an exemplary aspect. The neural network may be trained on a plurality of training data sets. A training data set may include plurality of pairs of map scheme objects associated with a respective satellite image, for example. For such a pair, a human moderator may manually associate an object from the map scheme with the object from the satellite image. For example, the human moderator may mark (via a user interface) a roof (e.g., having white color and rectangle shape) at the satellite image. Furthermore, the human moderator may associate the "roof" from the satellite image with the same "roof" at the scheme map. The training continues with a plurality of pair of objects. Now, the neural network may be able to track changes (and detect changes) based on learned associations of scheme map and satellite image.

Moreover, according to the exemplary aspect, the neural network may be further provided with a plurality of additional training data sets. The plurality of additional training data sets may comprise graphical objects (e.g., satellite images) each having a pair of an amended object. For example, a pair may be: (1) a first roof image having white color and (2) a second roof image having brown color, where the images may be of the same roof being different only in color. Another example of a pair may be a first building image having a balcony and a second building image having no balcony, where the image may again be of the same building. For each of the pairs, the neural network can be configured to generate a map of changes that shows pixels of the images, which may have been amended. For example, a first set of pixels (e.g., with coordinates space ($[X_1,X_1i]$; $[Y_1,Y_1i]$) are new and a second set of pixels (e.g., with coordinates ($[X_2,X_2i]$; $[Y_2,Y_2i]$) have changed colors. The color change for an individual pixel (e.g., in RGB system) may be [255,255,222] to [158,200,241], for example. For a set of pixels change, the neural network may determine to have a case of pixel region change. For the pixel region change, the neural network can determines at least one of: a) amount of pixels changes, b) average "level" of changes (e.g., switching black color to white color is a big change, while switching black color to grey is relatively smaller change), c) shape change may be determined by the neural network while a set of pixels have changed their location and\or have changed the shape (e.g., a black rectangle at the top left corner of a first image has turned into a black square, while remaining at the top left corner of a second image). Additionally, the neural network may study the context of a pixel and\or plurality of pixels by determining respective contexts. For example, a "context" may be a type of an image, for example, the neural network may detect a plurality of "buildings" objects and decide a first image shows a city view, or the neural network may detect a plurality of "trees" objects, taking a decision a second image represents a "forest". The specific type of the image may be determined by the neural network based on previously learned images. At the same time, the neural network may be aware of a general pattern of an image, for example, a set of images representing trees, which a human identifies as forest images, and the neural network may determine as a specific type (e.g., type #34, a lot of green similar objects) but not literary "forest".

In addition, the neural network may be trained to extract features from images according to an exemplary aspect. For example, the neural network may be trained using Semantic Segmentation technique (or any other type of features extraction, such as Deep feature synthesis, Isomap, or the like, for example.

Taking the example above, the first set of graphical features from the first object version may be a "roof" with a color "white" and size of 45×80 pixels of the image. Moreover, the second set of graphical features from the second object version may be a "roof" with a color "brown" and size of 45×80 pixels of the image. By extracting the graphical features from each version of the object, the feature extraction module 132 is configured to detect graphical differences between the two sets of graphical features.

As further shown, the feature extraction module 132 is coupled to the database 114A that can store one or more stored objects 122. That is, the image augmentation device 110 is configured to receive the image data from each of the image capturing devices, such as satellite 102, and generate image data that is stored in database 114A. It should be appreciated that in one aspect, the image data can be stored with associated metadata that generally indicates the location of the map (e.g., geographic coordinates), the date and time of year, and other related information. In this case, when the image augmentation device 110 receives a supplemental image that also includes this information, the feature extraction module 132 is configured to quickly identify, using the metadata, for example, the "base" image(s) to perform the object/feature extraction described above. In addition, in one aspect, the image augmentation device 110 can further store the new images in the database 114A and use the plurality of images for the machine learning algorithms of the feature extraction module 132, described above.

As further shown in FIG. 2, a graphical filter module 134 is configured to provide a stylization to the extracted feature. In other words, as described above, the extracted feature may have different stylization characteristics than the base image. In this regard, the graphical filter module 134 includes a second machine learning algorithm that is configured to generate a third set of graphical features based on the differences determined between the first set of graphical features of the first object version and the second set of graphical features of the second object version. Effectively, the third set of graphical features can be used to distinguish the object view between the first object version and the second object version.

According to the exemplary aspect, the graphical filter module 134 is further configured to generate the graphical filter (i.e., the stylization) to stylize the images in accordance with the graphical view of the first image. For example, if the base image is from wintertime and all of the objects are snow covered, but the extracted feature of the object version from the supplemental image is from the summer with no snow, the graphical filter module 134 is configured to use the third set of graphical feature, which indicates the differences between the extracted features, and to apply a snow stylization (e.g., adding a white color) to the identified object (e.g., a new building) so that it can effectively be blended into the mapped scene when it is added to the base image. Alternatively, if the base image is from the summer and the supplemental image is from the winter, the graphical filter may be applied to the identified object (e.g., a new building) to get rid of the snow on the roof, for example including color amendments and texture (e.g., wooden texture) for the graphical filter.

Thus, according to an exemplary aspect, the graphical filter module 134 may include a first machine learning algorithm (e.g., a neural network) that is configured to apply the style and a second machine learning algorithm that is trained separately and determines the level at which the amended picture is alike to the original picture and how stylistically close it is to the image (i.e., the supplemental image) with the stylized object to be transposed. In this regard, as described above, the machine learning algorithms of the graphical filter module 134 are configured to stylize pictures, for example, by receiving the two images (i.e., the base and supplemental image) of the same object, but with varying characteristics or parameters, such as the lighting of night verses day or shadowed verses no shadowed, the season of summer verses winter, the weather conditions of raining verses sunshine, and the like. The graphical filter module 134 is then configured to access the stylization database 114B that may include a plurality of stylizations 124 and rules to identify, based on the pairs of images, the rules for stylization for each of the objects.

For example, the stylization rules may have image filtering instructions that should be applied to the extracted feature(s) based on the comparison of the image and/or specific object. In one particular example, for a building (i.e., the identified object) when the base image and the supplemental image switches the style from night to day, the machine learning algorithm can be trained based on stylization rules to switch colors of the extracted feature (e.g., a +10 for brightness and add +1 for each of the RGB colors, turning, for example a first RGB color [250,250,001] into a second RGB color [251,251,002]). In this example, the texture of the extracted feature will not change. Based on these rules, the image processing module 136 is further configured to modify the image of the extracted feature by editing the image to incorporate these changes.

In another example, if water (e.g., a pool) is the extracted feature that was not in the base image (e.g., previously a back yard with grass), the machine learning algorithm of the graphical filter module 134 is configured to switch texture of the image by amending the pixels, moving the pixels, deleting pixels, etc., of the base image. Yet further, for winter to summer pictures transitions and vice versa, the machine learning algorithm of the graphical filter module 134 may store "ice" texture samples, "deep water" forest lake samples, and the like, as stylization templates in the database 114B that can subsequently accessed during the augmentation process. In this regard, each sample relates both to the object itself (i.e., a lake) and its context (i.e., the lake is in the forest) where the context may be shared by the machine learning algorithm.

Furthermore, according to the exemplary aspect, the image augmentation module 130 includes an image processing module 136 that is configured to use the stylization rules identified by the graphical filter module 134 to amend the base image with the extracted and stylized features. In other words, the image processing module 136 is configured to augment the base image with the new features (e.g., the third set of graphical features) to create a revised or updated image. This updated image can then be transmitted, using the interface 140, to a display device, such as personal computer 106 to be display on a screen thereof.

As described above, the feature extraction module 132 is configured to identify objects in images and extract specific features. In an exemplary aspect, the feature extraction module 132 includes a neural network that identifies the objects using semantic segmentation of the received image. In general, for each pixel in the image, multiple image features can be determined that correspond to texture, color etc. For example, in the exemplary aspect, the feature extraction module 132 can assign each pixel to a class (e.g., road, house, body of water, and the like) and, within each class, the neural network may be trained on previous pictures to assign weights for each of the class. For example, a pixel with coordinates (0,1) within the image may have RGB colors [255, 255, 222] and weights [5, 10, 0]. Moreover, the weights can indicate that the pixel is determined by the neural network to be a road with 5% probability, with to be a house/building with 10% probability, and to be a lake or other water type with 0% probability. When trained, the neural network can look at the pixel itself (colors) as well as neighboring pixels, for example, pixels at coordinates (1,1), (1,0), (0,2) and so forth.

In the exemplary aspect, the neural network can further determine the weight for each neighboring pixel both in general at the picture and overall, for example, the same type of a tree is deemed to generally be of the same size, and the like. Moreover, the neural network of the feature extraction module 132 can be trained with the geospatial pictures and the scheme can be manually prepared, e.g., by human operators/assessors. The resulting scheme (e.g., Yandex Maps, Google Maps, etc.) can shows the located buildings, roads, bodies of water, and the like. As such, the neural network of the feature extraction module 132 can effectively be trained to identify on satellite images which pixel belongs to which category (i.e., type of feature, such as tree, building, etc.) and which features are used, i.e., texture, color, and context, for example.

According to the exemplary aspect, since the neural network of the feature extraction module 132 is trained accordingly, the neural network can quickly identify the objects at a picture for new incoming pictures. The neural network may use filters to quickly identify objects as compared with the conventional pixel-by-pixel analysis. For example, the filters used may have a plurality of learned templates that are common for a specific type of pictures, for example mapped images captured by satellite 102.

According to this aspect, the neural network of feature extraction module 132 is configured to apply the plurality of filters in order to detect the presence and situation of the one or more objects within the image. Table 1 as follows illustrates an example of the types of filters that may be used:

TABLE 1

| Filter Type | Weight (Presence Indication) | Amount of Pixels of Object | Coordinates in Picture |
|---|---|---|---|
| Line: — | 3 (presents three times) | 97 | Beginning at [100, 1002] |
| Triangle: ∆ | 1 (one time) | 178 | Beginning at [1092, 856] |
| Cross: χ | 0 (not detected) | — | — | where the weight ( )=presence counter of a specific object within the specific image.

Thus, according to the exemplary aspect, the filter type may indicate the probability that the identified object is a specific type of expected object in the image. For example, based on the plurality of results of the applied filters, the neural network may determine that, based on previous trainings, a line with a triangle is a tree. It should be appreciated that this is a simplified example, but the neural network can be trained with sophisticated filters to quickly identify the types of objects in the image. Thus, in general, a superimposed filter can identify a meaning of line in connection with something else or vice versa. As a result, the neural network of the feature extraction module 132 is configured to identify the contexts of the portions of the pictures.

Figure 3:
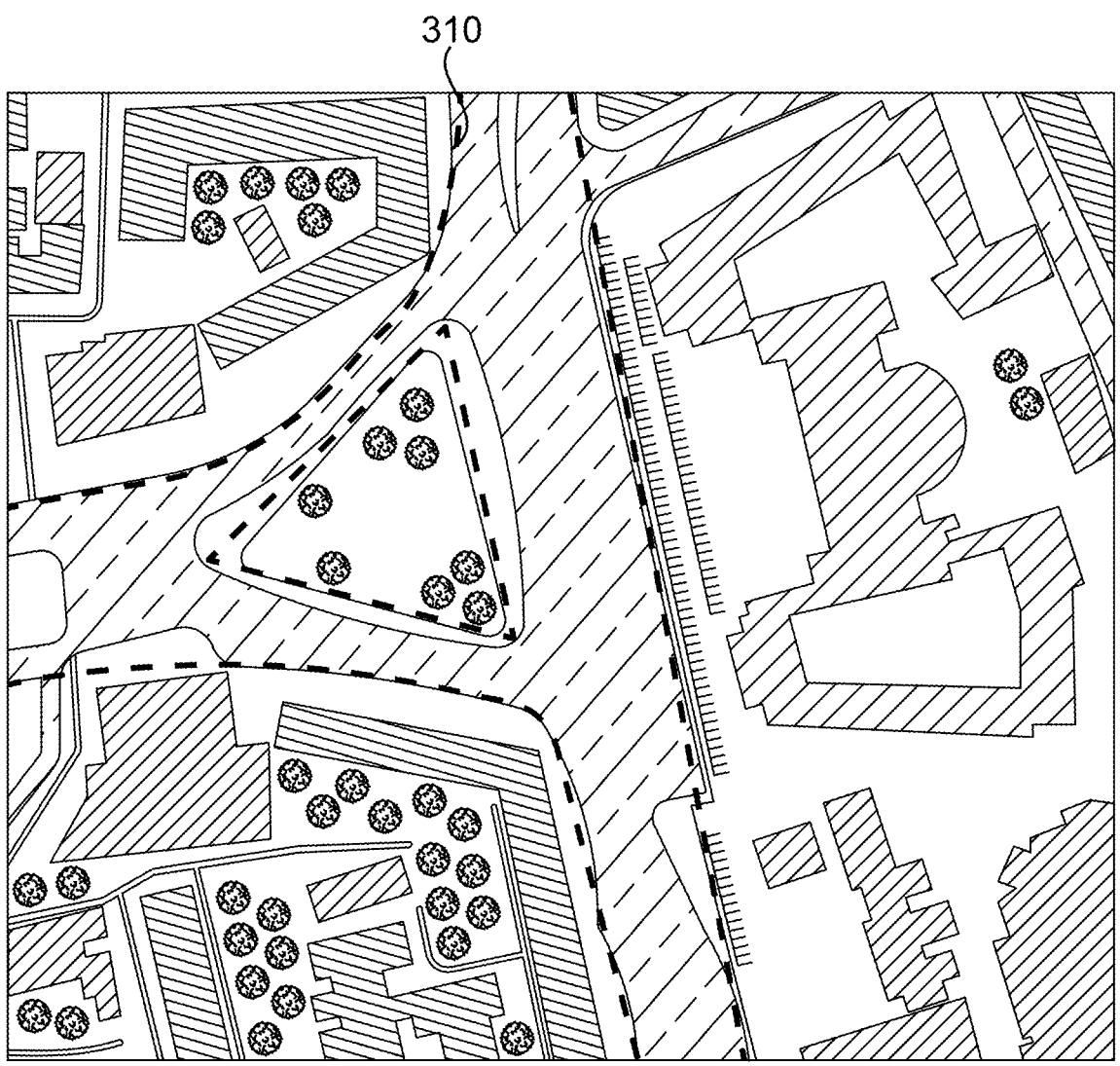
FIG. 3 illustrate an exemplary satellite mapped image analyzed by the feature extraction module according to an exemplary aspect.

FIG. 3 illustrates an exemplary satellite mapped image analyzed by the feature extraction module 132 according to an exemplary aspect. In this example, the image 300 can be captured by satellite 102 and transmitted to the image augmentation device 110. The filter type may be a plurality of lines that extend for a predetermined number of pixels, for example. Thus, as a result, the machine learning algorithm of the feature extraction module 132 can be configured to apply the filters to the image 300 to identify plurality of objects within the image 300. Among other objects, as shown, the feature extraction module 132 is configured to identify a plurality of roads 310. That is, using the filters as described above, the feature extraction module 132 is configured to identify the borders of the roads 310 as extending in a straight line over a predetermined number of pixels in image 300, for example. If these lines are identified (and there are no other features identified in adjacent pixels), the machine learning algorithm can determine with a relatively high probability that the identified feature 310 is a road.

Figure 4:
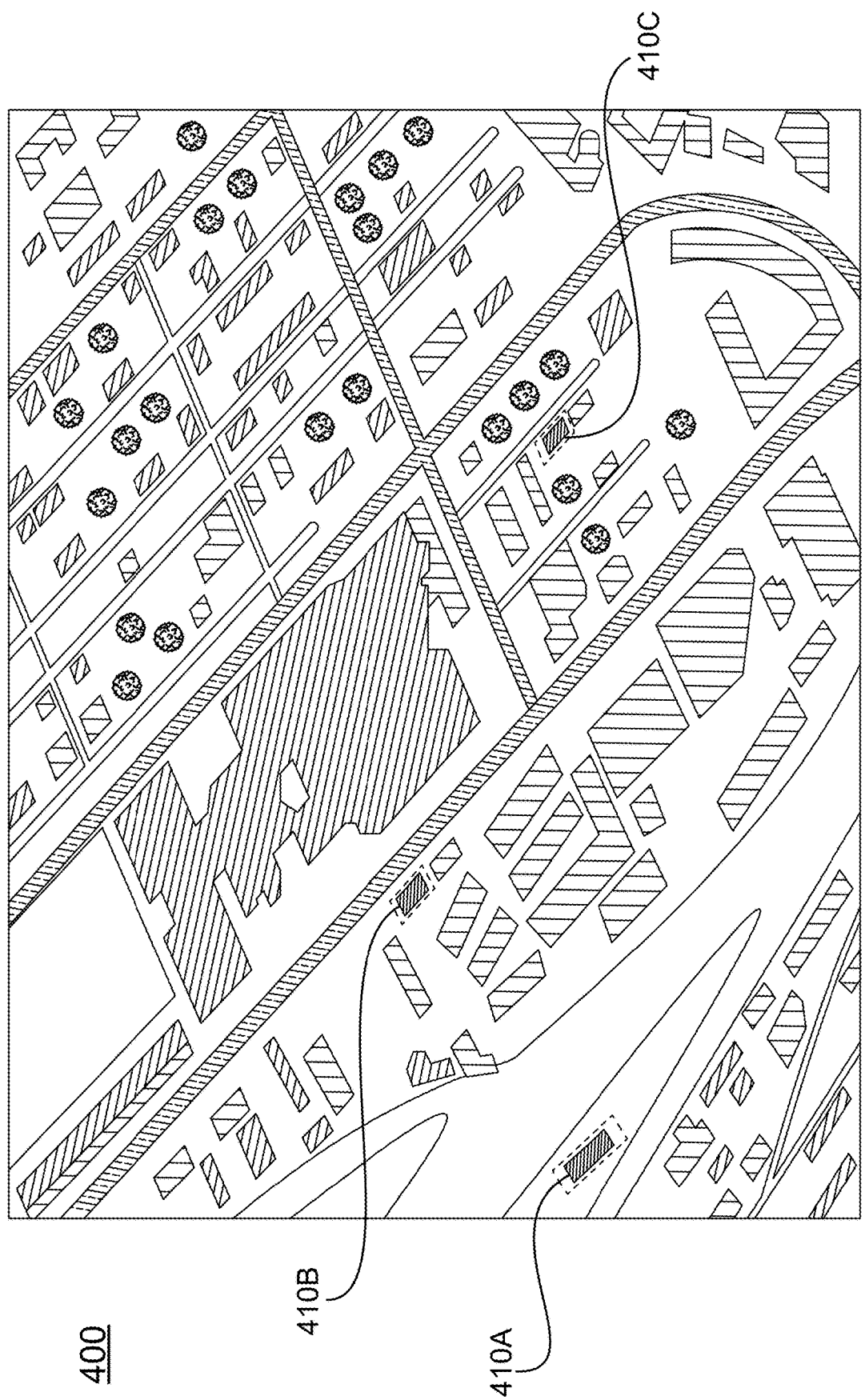
FIG. 4 illustrates another exemplary satellite mapped image analyzed by the feature extraction module according to an exemplary aspect.

FIG. 4 illustrates another exemplary satellite mapped image analyzed by the feature extraction module 132 according to an exemplary aspect. In this example, the image 400 can be captured by satellite 102 and transmitted to the image augmentation device 110. Moreover, the filter type may be a plurality of neighboring lines that collectively form a rectangle or rectangle shape. In this case, the machine learning algorithm of the feature extraction module 132 can be configured to apply the filters to the image 400 to identify plurality of objects as buildings 410A, 410B and 410C within the image 400. Thus, according to the exemplary aspect, it is contemplated that image 400 is a supplemental image received from satellite 102 and that buildings 410A-410C may be identified as new buildings when analyzed in view of a base image that at least partially overlaps with image 400, but may be from a year ago, for example, such that buildings 410A-410C had not been built yet and thus did not show up on the base mapped image. Therefore, upon receiving the supplemental image 400, the feature extraction module 132 is configured to apply the machine learning algorithm, which uses a plurality of filters as described above, to identify the new buildings 410A-410C.

Figure 5A:
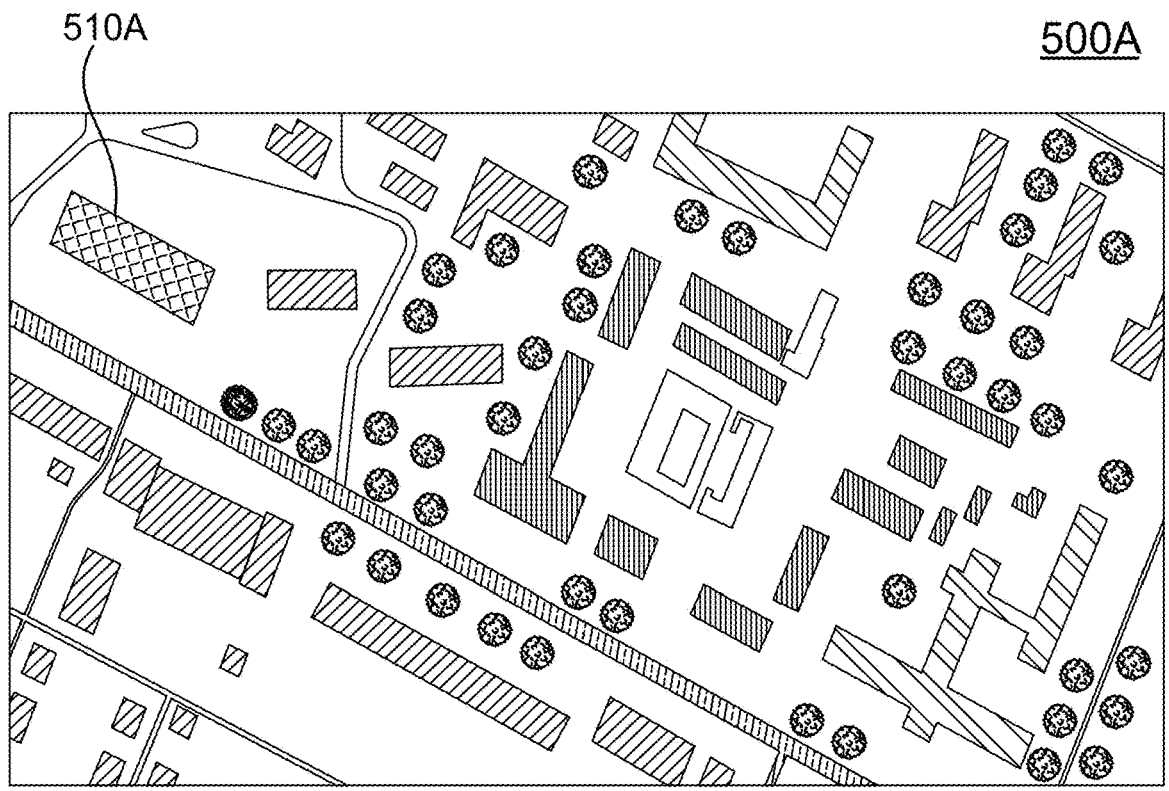
FIGS. 5A and 5B illustrate another exemplary satellite mapped image analyzed by the feature extraction module according to an exemplary aspect.
Figure 5B:
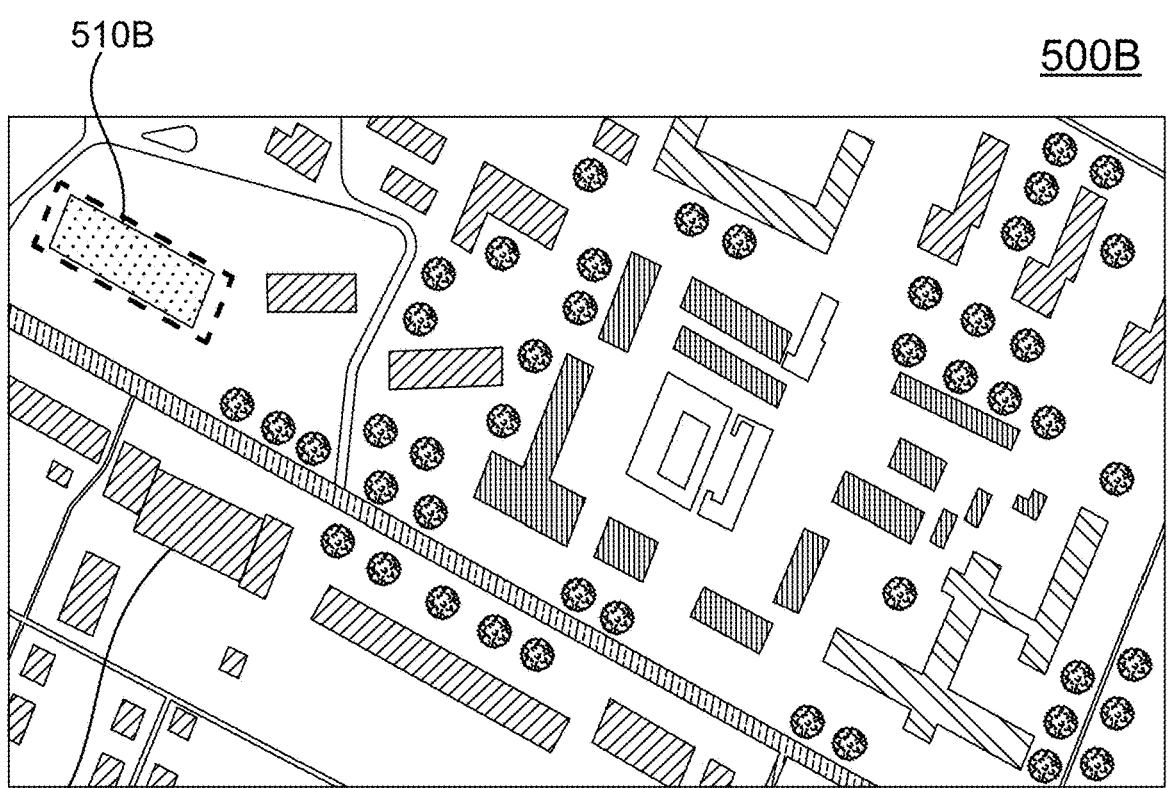

FIGS. 5A and 5B illustrate another exemplary satellite mapped image analyzed by the feature extraction module according to an exemplary aspect. In this case, FIG. 5A depicts the received image 500A that contains a space 510A where a building used to exist in the base (i.e., original or predecessor) image, but has been removed from the new image. Thus, as shown in FIG. 5B, after the filters are applied by the feature extraction module 132, all of the buildings can be identified (e.g., building 520), which existed in the original satellite image and the new satellite image 510A, as well as missing building, such as the space shown as 510B, which is illustrated according to the dashed rectangle. In this case, the third set of graphical features, which is the difference between the set of graphical features from the first object version and the set of graphical features from the second object version, can be considered "null", indicating the object in the supplemental image has been removed.

Once the new objects are identified by the feature extraction module 132, as shown in any of the exemplary images described above, the image augmentation module 130 is further configured to transpose the object to augment the base image. Thus, in an exemplary aspect, the feature extraction module 132 is further configured to identify the contour of the identified object(s), for example, using Semantic Segmentation to obtain the contour with a potential error margin for each of the object. For example, a first object (i.e., a first plurality of pixels or pixel spaces in the supplemental image) with contours can be a car (i.e., with a set of surrounding pixels not to lose pixels of the object itself). Moreover, a second object (i.e., a second plurality of pixels or pixel spaces) can be identified as a building and so forth. Once the contours of the object are identified, the feature extraction module 132 is configured to cut out the contour of the identified object and create a temporary image file of the object to be transposed to the base image.

Once the object is identified and extracted, the graphical filter module 134 is configured to provide a stylization to the extracted object as described above. That is, the graphical filter module 134 is configured to modify the extracted object (which may be temporarily stored as a separate image file), using the third set of graphical features, so that it effectively has the same features (i.e., "style") as the base image. In this regard, the base image may be associated with certain features, such as winter, snow conditions, day time, and the like. This information may be stored as metadata with the base image in database 114A or obtained by performing a subsequent analysis of the base image. The graphical filter module 134 is then configured to amend or modify the object using image editing techniques so that the extracted object includes similar features (e.g., snowy conditions) as the base image so that it can effectively be blended into the mapped scene when it is added to the base image. Finally, the image processing module 136 is configured to transpose the filtered extracted object onto the base image to effectively created an augmented image. For example, in one aspect, the image processing module 136 transposes the object, but effectively overlaying the filtered object onto the base image. In another aspect, the image processing module 136 may transpose the object by applying to the object and/or object borders blurring techniques. In yet another aspect, the image processing module 136 may also use gradient(s) smoothing techniques to smooth transition boundaries of at least one of the object and the base image.

Figure 6:
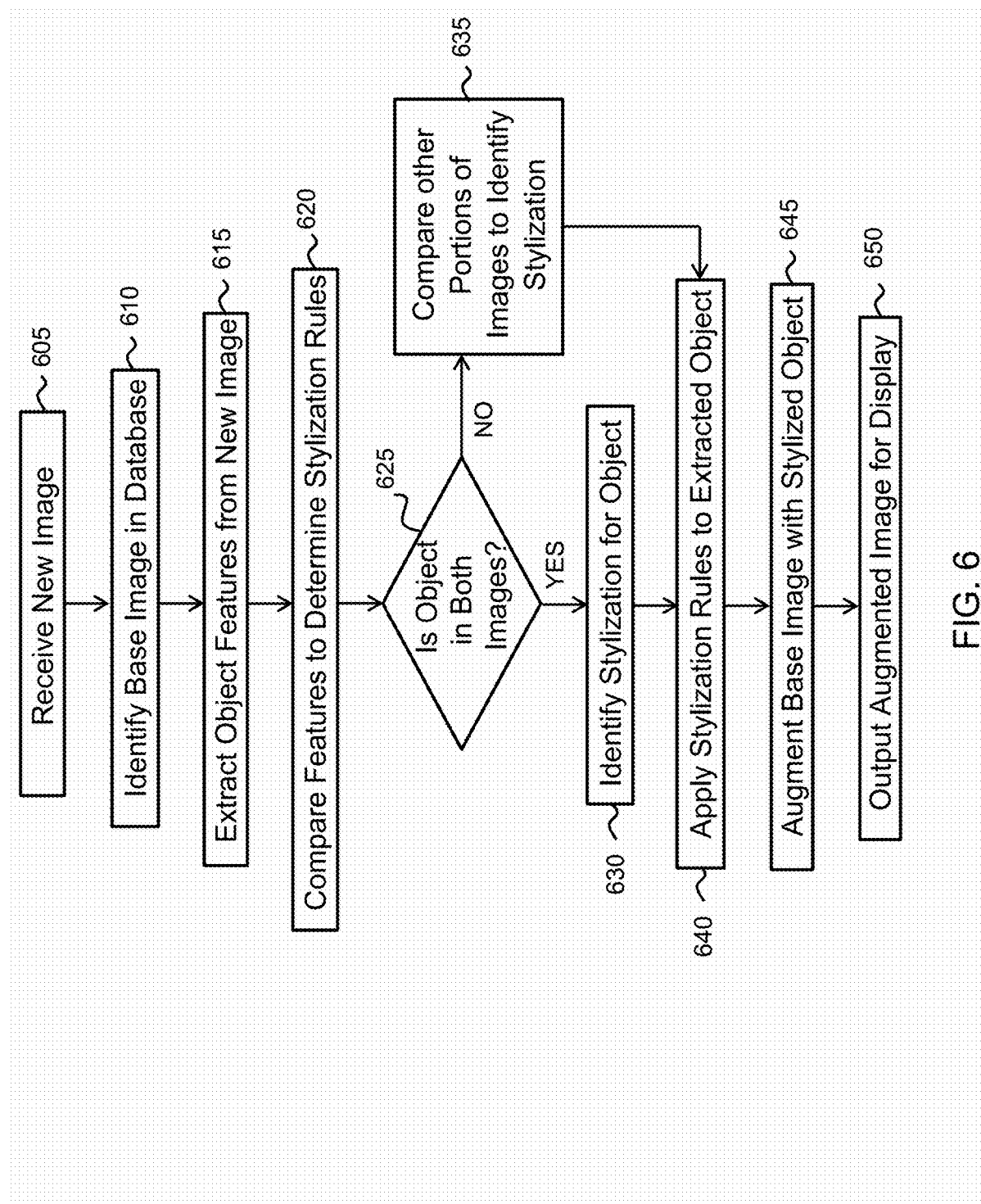
FIG. 6 illustrates a flowchart for a method for augmenting a digital image with stylized features according to an exemplary aspect.

FIG. 6 illustrates a flowchart for a method for augmenting a digital image with stylized features according to an exemplary aspect. It should be appreciated that the following description of the exemplary method refers to the exemplary components described above. As shown, initially at step 605, a new or supplemental image is received by the image augmentation device 110. Based on metadata associated with the supplemental image, the image augmentation device 110 is configured to identify a corresponding base image in database 114 at step 610 that at least partially overlaps the scene of the supplemental image and vice versa. Then, at step 615, once the base image is identified, the feature extraction module 132 is further configured to identify common objects in each of the images and extract graphical features of each version of the object, using the machine learning algorithms described above.

As further shown, the graphical filter module 134 uses a machine learning algorithm to compare the extracted features from each object version to identify stylization rules for the identified object at step 620. In one aspect, the graphical filter module 134 can determine if the object is in both images at step 625, but has different graphical features. For example, in the base image, the identified object may be water, but is frozen since the image was captured during winter. Moreover, the supplemental image may include the water, but not frozen since the image was captured in summer. In this aspect, the method proceeds to step 630 where the stylization for the object is identified by extracting graphical features of the object from each image and determining a third set of graphical features as the difference between the extracted features. Alternatively, if the object is not in both images (e.g., a "null" result for the third set of graphical features), the method can proceed to step 635 where, for example, other portions of the images can be compared to identify appropriate stylization by extracting relative graphical features. In yet another aspect, the stylization and/or stylization rules can be accessed from database 114B, for example.

In any event, once the appropriate stylization is identified based on the third set of graphical features, the stylization is applied by the graphical filter module 134 to the identified object at step 640. That is the contour of the object is cut out from the supplemental image and stylized using the neural network. Then, this stylized object is transposed to the base image to create an augmented image at step 645. Finally, this augmented image can be output at step 650 for display on a display device, for example. It is noted that the display can be any type of electronic display for viewing images or can be any type of rendering adapted to view images, for example.

It should be appreciated that while the exemplary system and method is described with respect to mapped satellite images, the algorithms described herein can be used to augment any type of image. For example, the algorithms can be used for video editing, for example, by augmenting a video stream by adding/modifying some type of object in the video frames that was not otherwise there in the original frames (e.g., transforming a first name in Chinese into a second name in English throughout a video stream). Moreover, if the images are captured are electronic photographs, the machine learning algorithms provide a methodology for automatically editing manipulating the base image with extracted objects and features of a subsequent image. Furthermore, the exemplary system and method described herein may also be applicable to detecting changes and respectively amending contents for augmented reality services and solutions (e.g., for augmented reality games and for augmenting (with image and video) a driver window for better driving experience in a car). In such a scenario, a driver may be looking for a specific point of interest ("POI"), say a Starbucks™. Using a map/navigation application (e.g., Yandex Navigator and Yandex Maps) the driver may receive a route to the closest Starbucks™ to the than user current location. The driver may receive the route to the closest Starbucks™ and may wish to see the POI visually highlighted through the car's driver window. The specific POI overview may be determined based on panoramic images associated with the object within the map service (e.g., Yandex Panoramas or Google Street view). Based on the POI overview, the machine learning algorithm described herein may amend the POI overview by, as an example, highlighting colors of a building the POI situates in, showing in a different color and shape a free parking slot close to the POI. In other words, the exemplary system and method described herein may work in real time helping drivers and pilots. At the same time, in another embodiment, the exemplary system and method described herein may also aid colorblind people by amending colors in real time for users of mobile device including (and not limiting) wearable glasses.

Figure 7:
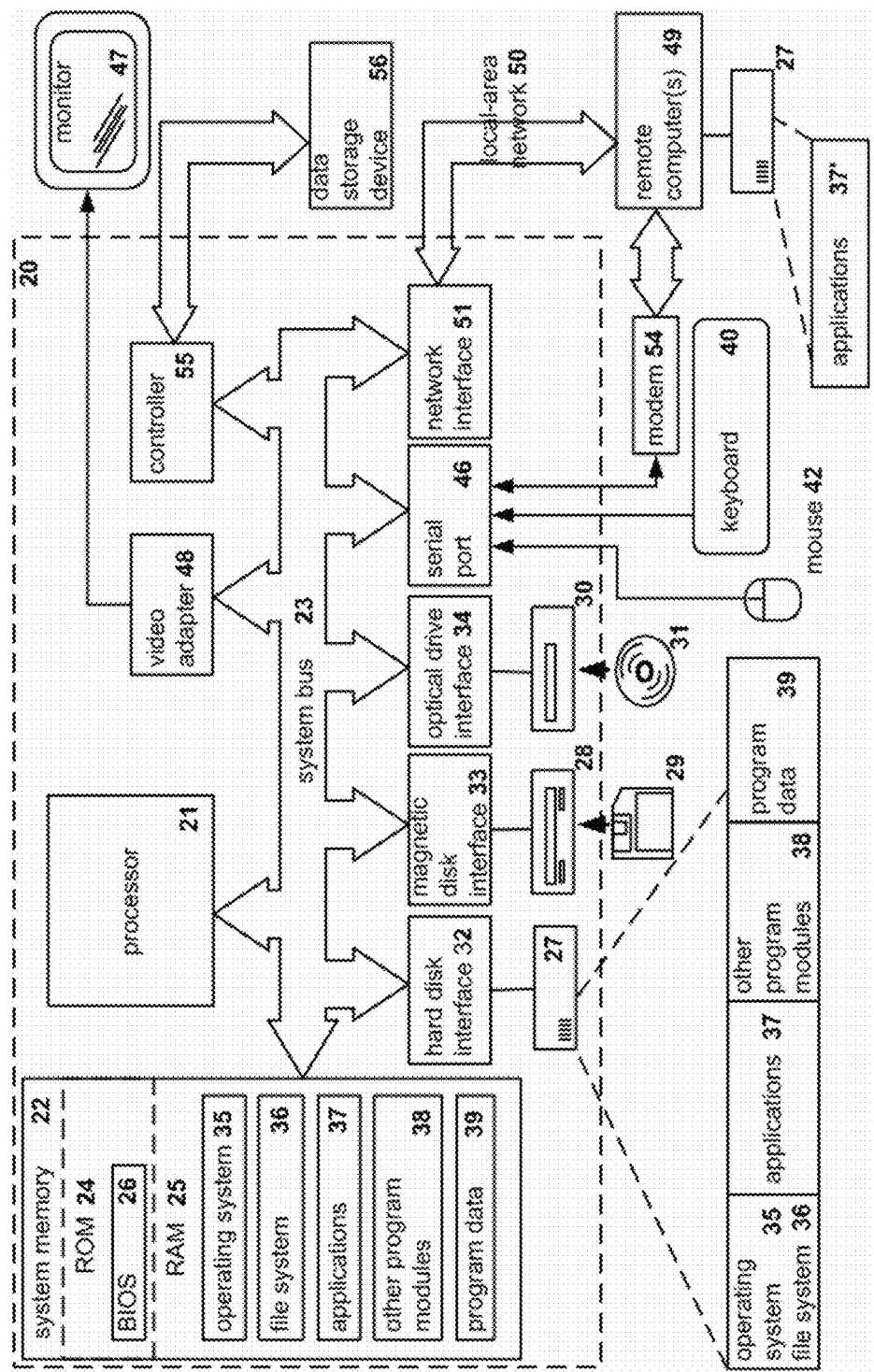
FIG. 7 illustrates a block diagram of an example of a general-purpose computer system (which can be a server) on which the disclosed system and method can be implemented according to an example aspect.

FIG. 7 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the image augmentation device 110, for example.

In this aspect, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

Moreover, the computer 20 may further include a hard disk drive 27 (corresponding to hard disk 136, for example) for reading from and writing to a hard disk (e.g., hard disk 136), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for augmenting an image, the method comprising:
    identifying, in a first image, a first version of an object having a first set of graphical features;
    identifying, in a second image, a second version of the object having a second set of graphical features, wherein the first and second version of the object represent a same object;
    extracting the first and second sets of graphical features from the first and second images, respectively;
    generating a third set of graphical features by calculating differences between the first set of graphical features of the first version of the object and the second set of graphical features of the second version of the object;
    providing a graphical filter based on a stylization of a graphical view of the first image;
    transforming the third set of graphical features based on the graphical filter to render a transformed third set of graphical features; and
    augmenting the first version of the object in the first image based on the transformed third set of graphical features.

2. The method according to claim 1, further comprising causing the first image to be displayed after the augmenting of the first version of the object in the first image.

3. The method according to claim 1, wherein the generating of the third set of graphical features comprises generating a null third set of graphical features if the second version of the object is not included in the second image.

4. The method according to claim 3, wherein the augmenting of the first version of the object in the first image comprises removing the object from the first image in response to the null third set of graphical features.

5. The method according to claim 1, further comprising determining changes in at least one of a color, shape, size and texture of the object between the first version and the second version of the object based on the third set of graphical features.

6. The method according to claim 5, wherein the augmenting of the first version of the object in the first image comprises stylizing the object based on the determined changes in the at least one of a color, shape, size and texture of the object.

7. A system for augmenting a digital image, the system comprising:
    a database configured to store a first image including a first version of an object having a first set of graphical features; and
    a processor configured to:
        receive a second image including a second version of the object having a second set of graphical features, wherein the first and second version of the object represent a same object,
        extract the first and second sets of graphical features from the first and second images, respectively;
        generate a third set of graphical features by calculating differences between the first set of graphical features of the first version of the object and the second set of graphical features of the second version of the object;

generate a graphical filter based on a stylization of a graphical view of the first image;

transform the third set of graphical features based on the graphical filter to render a transformed third set of graphical features; and augment the first version of the object in the first image based on the transformed third set of graphical features.

8. The system according to claim 7, wherein the processor is further configured to cause the first image to be displayed after the augmenting of the first version of the object in the first image.

9. The system according to claim 7, wherein the processor is further configured to generate the third set of graphical features as a null third set of graphical features if the second version of the object is not included in the second image.

10. The system according to claim 9, wherein the processor is further configured to augment the first version of the object in the first image by removing the object from the first image in response to the null third set of graphical features.

11. The system according to claim 7, wherein the processor is further configured to determine changes in at least one of a color, shape, size and texture of the object between the first version and the second version of the object based on the third set of graphical features.

12. The system according to claim 11, wherein the processor is further configured to augment the first version of the object in the first image by stylizing the object based on the determined changes in the at least one of a color, shape, size and texture of the object.

13. The system according to claim 7, wherein the second image is generated based on image data obtained by a satellite.

14. A non-transitory computer readable medium comprising computer executable instructions for augmenting an image, including instructions for:

identifying, in a first image, a first version of an object having a first set of graphical features;

identifying, in a second image, a second version of the object having a second set of graphical features, wherein the first and second version of the object represent a same object;

extracting the first and second sets of graphical features from the first and second images, respectively;

generating a third set of graphical features by calculating differences between the first set of graphical features of the first version of the object and the second set of graphical features of the second version of the object;

providing a graphical filter based on a stylization of a graphical view of the first image;

transforming the third set of graphical features based on the graphical filter to render a transformed third set of graphical features; and augmenting the first version of the object in the first image based on the transformed third set of graphical features.

* * * * *